US012448819B2

(12) United States Patent
Lin

(10) Patent No.: US 12,448,819 B2
(45) Date of Patent: Oct. 21, 2025

(54) DOOR LOCK STRUCTURE

(71) Applicant: THASE ENTERPRISE CO., LTD., New Taipei (TW)

(72) Inventor: Ching-Tien Lin, New Taipei (TW)

( * ) Notice: Subject to any disclaimer, the term of this patent is extended or adjusted under 35 U.S.C. 154(b) by 20 days.

(21) Appl. No.: 18/736,482

(22) Filed: Jun. 6, 2024

(65) Prior Publication Data

US 2025/0237085 A1 Jul. 24, 2025

(30) Foreign Application Priority Data

Jan. 19, 2024 (TW) ................................ 113200696

(51) Int. Cl.

| | |
|---|---|
| ***E05B 65/10*** | (2006.01) |
| ***E05B 15/10*** | (2006.01) |
| ***E05B 63/22*** | (2006.01) |
| *E05B 15/04* | (2006.01) |
| *E06B 5/16* | (2006.01) |

(52) U.S. Cl.

CPC .......... *E05B 65/1053* (2013.01); *E05B 15/10* (2013.01); *E05B 63/22* (2013.01); *E05B 2015/0403* (2013.01); *E06B 5/16* (2013.01)

(58) Field of Classification Search

CPC .. E05B 15/10; E05B 2015/0403; E05B 63/22; E05B 65/10; E05B 65/1046; E05B 65/1053

See application file for complete search history.

(56) References Cited

U.S. PATENT DOCUMENTS

| | | | | |
|---|---|---|---|---|
| 3,877,262 A * | 4/1975 | Williams | ............ | E05B 65/1073 70/92 |
| 5,169,185 A * | 12/1992 | Slaybaugh | .......... | E05B 65/1053 292/92 |
| 5,340,171 A * | 8/1994 | Slaybuagh | .......... | E05B 65/1053 292/201 |
| 5,890,752 A * | 4/1999 | Lin | ...................... | E05B 65/104 292/DIG. 65 |
| 6,854,773 B2 * | 2/2005 | Lin | ...................... | E05B 65/104 292/DIG. 65 |
| 8,424,929 B2 * | 4/2013 | Baragano | ............ | E05B 65/1053 292/93 |
| 8,528,946 B2 * | 9/2013 | Shen | .................. | E05B 65/1053 70/92 |
| 11,795,733 B2 * | 10/2023 | Huang | ................ | E05B 65/1053 |
| 2017/0081883 A1 * | 3/2017 | Lin | ..................... | E05B 65/1093 |

* cited by examiner

*Primary Examiner* — Christopher J Boswell

(57) ABSTRACT

A door lock structure is disclosed. The door lock structure is used to mount a fire door and includes a base, a pressing component, a pressing shell and a locking component. The base is disposed on the fire door and has an accommodation groove, and a groove bottom of the accommodation groove has a first locking hole. The pressing component includes a pressing base, a roller column, a fixing plate, an elastic part and a locking part.

11 Claims, 9 Drawing Sheets

DOOR LOCK STRUCTURE

CROSS-REFERENCE TO RELATED APPLICATIONS

This application claims the priority benefit of Taiwan Patent Application TW113200696, filed on Jan. 19, 2024, the full disclosure of which is incorporated herein by reference.

TECHNICAL FIELD

The present application is related to a technical field of fire door, and particularly is related to a door lock structure.

BACKGROUND OF THE INVENTION

In the conventional techniques, the door lock of the fire door is transversely disposed on the center of the fire door. According to the usual way of using the door lock on a fire door, the push handle in the handle frame is configured in the center of door plank for pressing. By pressing the push handle, the lock bolt in the lock device is pulled down for inward retracting, so as to allow the fire door being opened by releasing the lock. However, in the assembling process for the push handle, structural tolerance issues between the push handle and the handle frame will occur, and corresponding tolerance issues in the elastic structure will also occur because the movement of the elastic structure is followed by the push handle. The abovementioned issues will affect pressing to unlock the door lock of the fire door (such as be stuck or not pressing smoothly, etc.). The abovementioned structural tolerance is also related to safety issues. Therefore, how to overcome the abovementioned problems of the conventional technology is one of the issues that need to be solved at present.

SUMMARY OF THE INVENTION

The embodiments of the present application provide a door lock structure and resolve the issue of not mounting push handle smoothly due to the structural tolerance of the current door lock.

To solve the abovementioned technical issues, the present application is embodied as follows.

A door lock structure for installing on a fire door is provided. The door lock structure includes a base, a pressing component, a pressing shell and a locking component. The base is disposed on the fire door. The base has an accommodation groove, and a groove bottom of the accommodation groove has a first locking hole. The pressing component includes a pressing base, a roller column, a fixing plate, an elastic part and a locking part. The pressing base has a base groove, a bottom of the base groove has an adjusting hole, the fixing plate has a second locking hole, a hole area of the adjusting hole is larger than those of the first locking hole and the second locking hole, one end of the locking part is sequentially inserted through the first locking hole, the adjusting hole and the second locking hole, the fixing plate fixes the pressing base on the groove bottom of the accommodation groove, two lateral inner sides of the base groove have two sliding holes, two ends of the roller column are respectively and slidingly disposed in the two sliding holes, one end of the elastic part abuts against the fixing plate, the other end of the elastic part abuts against a bottom of the roller column, and the roller column moves to one end of the sliding hole. Two lateral sides of the pressing shell abut against the two ends of the roller column, respectively. The locking component disposed on one end of the base. The locking component includes a gearing component and a lock, the pressing shell presses one end of the gearing component, and the other end of the gearing component moves the lock. The pressing shell presses toward to the base, the pressing shell presses the two ends of the roller column, the two ends of the roller column move along the two sliding holes, the roller column presses the elastic part, the elastic part is in a compression state, the pressing shell presses the gearing component, and the gearing component moves the lock.

In one embodiment, a radial axis of the sliding hole and a surface of the bottom plate forms an angle, and one end of the sliding hole extends along a direction of the angle.

In one embodiment, each of the lateral plates has a notch part disposed on one side of the sliding hole.

In one embodiment, the roller column includes a column body, two inner wheels and two outer wheels, two ends of the column body pass through the two sliding holes respectively, the two inner wheels are disposed on the two ends of the column body and located at two sides of the pressing base, the two outer wheels are disposed on the two ends of the column body, and the outer wheel is disposed outside the inner wheel relatively, and the two lateral sides of the pressing shell abut between the inner wheels and the outer wheels.

In one embodiment, the fixing plate has a plate body part and two limiting parts, the two limiting parts are disposed on two ends of a long side of the plate body part respectively, a width of the plate body part is less than that of the bottom plate, a length of the plate body part is larger than that of the bottom plate, the two limiting parts respectively extend from the two ends of the plate body part to the two lateral sides, a width of each of the two limiting parts is larger than that of the bottom plate.

In one embodiment, the elastic part includes a fixing shaft and a torsion spring, two ends of the fixing shaft are fixed on the two lateral plates, the torsion spring is wound around the fixing shaft, one end of the torsion spring abuts against the fixing plate, and the other end of the torsion spring abuts under the roller column.

In one embodiment, the locking component further comprises a locking base, a driving fix bracket and a driving pivot shaft, the locking base is disposed at one end of the base, the driving fix bracket is disposed on the locking base, the driving pivot shaft is disposed on the driving fix bracket, the gearing component comprises a pressing part, a pivot part and a gearing component, the pressing shell abuts against one end of the pressing part, the other end of the pressing part is connected to one end of the gearing component, the other end of the gearing component abuts against the lock, the pivot part is disposed between the pressing part and the gearing component, and the pivot part is rotationally disposed on the driving pivot shaft.

In one embodiment, the locking component further comprises an auxiliary fixing shaft and an auxiliary torsion spring, the auxiliary fixing shaft is disposed on the driving fix bracket, the auxiliary torsion spring is disposed on the auxiliary fixing shaft, one end of the auxiliary torsion spring is fixed on the driving fix bracket, and the other end of the auxiliary torsion spring abuts against the gearing component of the gearing component.

In one embodiment, the locking component further comprises a lock fix bracket, a lock pivot shaft and a lock torsion spring, the lock fix bracket is disposed on the locking base, the lock pivot shaft is rotationally disposed on the lock fix bracket, the lock is disposed on the lock pivot shaft, one end of the lock torsion spring abuts against the lock, the other end of the lock torsion spring abuts against the locking base, and one end of the lock torsion spring drives the lock to rotate outwardly.

In one embodiment, the lock further comprises a fixing protrusion part and a lock gearing part, the lock gearing part is disposed on one side of the fixing protrusion part, the lock pivot shaft is disposed between the fixing protrusion part and the lock gearing part, the other end of the gearing component abuts against the lock gearing part of the lock.

In one embodiment, the locking base further comprises a first limiting part, one end of the lock further comprises a second limiting part, the first limiting part is located on a path that the second limiting part of the lock rotates outwardly, and the second limiting part of the lock rotationally abuts against the first limiting part of the locking base.

A door lock structure is provided in which the fixing plate of the pressing component serves as a structure of adjusting the fixed position of the pressing base. The locking part sequentially locks the first locking hole of the base, the adjusting hole of the pressing base and the second locking hole of the fixing plate. The first locking hole of the base and the second locking hole of the fixing plate are in relatively restricted fixing positions. The hole area of the adjusting hole of the pressing base is larger than the hole areas of the first locking hole and the second locking hole, so the fixing position of the pressing base is not limited by the first locking hole and the second locking hole. Thus, the pressing base can adjust position according to the tolerance of the inner structure, which is beneficial to the assembly of the door lock structure.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF DRAWINGS

The accompanying drawings herein are provided to have a further understanding on the present application and constitutes a part of the present application. The schematic embodiments and the description of the present application is used to explain the present application instead of constituting inappropriate limitation. In the drawings.

DETAILED DESCRIPTION OF THE INVENTION

Figure 1:
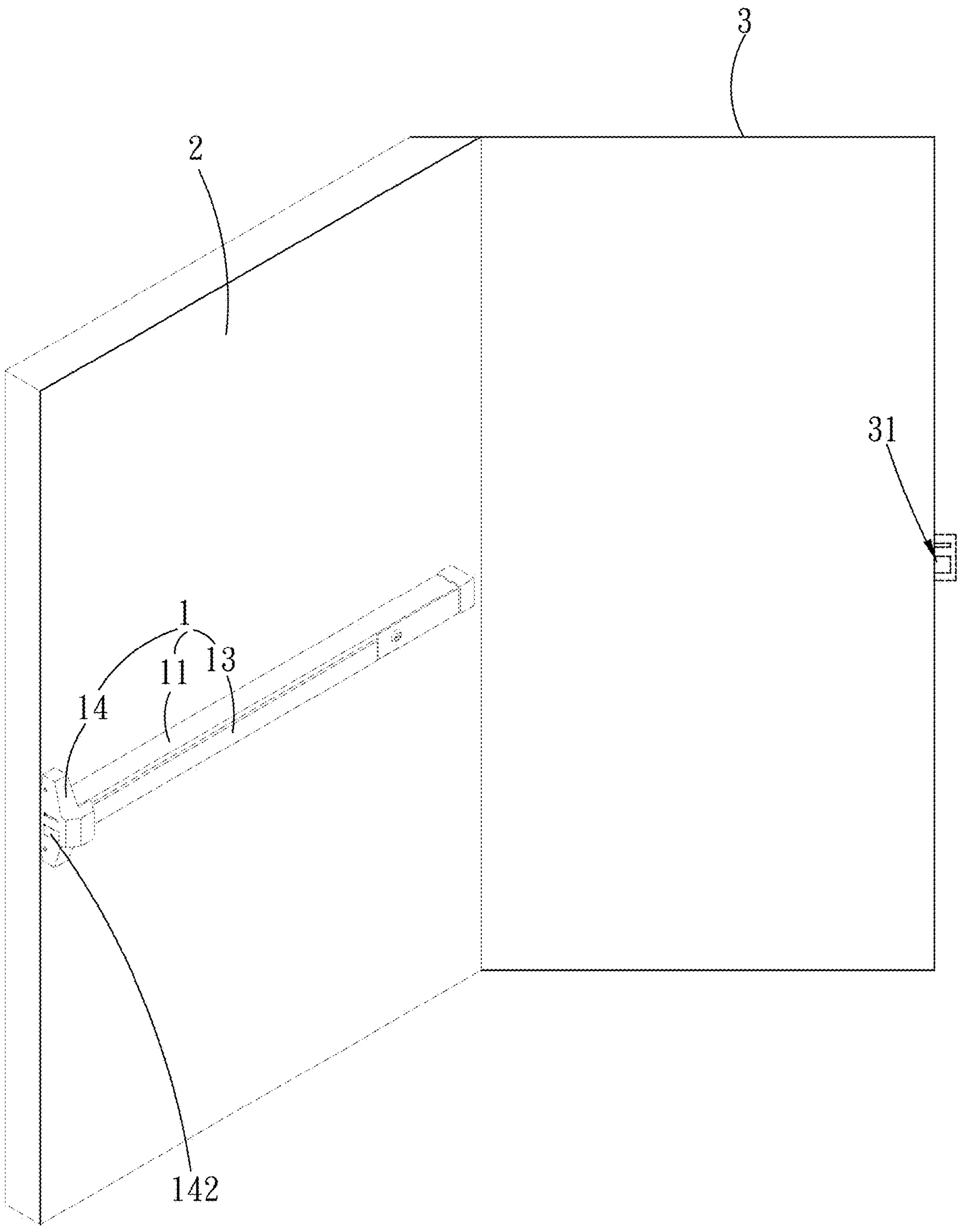
FIG. 1 is a perspective view of the fire door and door lock structure of the present application.

The multiple embodiments of the present application are disclosed by the drawings as follows, and for precise explanation, the implementing details of the present application will be described together with the multiple embodiments of the present application in the following paragraphs. However, it should be understood that the implementing details of the present application should not be construed as the restrictions of the present application. In other words, in some of the embodiments of the present application, the implement details of the present application are not essential. Besides, for simplifying the drawings, some well-known structures and modules are schematically shown to simplify the drawings. In the following embodiments, the same reference numerals in different drawings represent the same or similar modules.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that comprises a series of elements not only include these elements, but also comprises other elements not specified expressly, or may include inherent elements of the process, method, object, or device. If no more limitations are made, an element limited by "include a/an . . . " does not exclude other same elements existing in the process, the method, the article, or the device which comprises the element.

In the following embodiment, the same reference numerals are used to refer to the same or similar elements throughout the invention.

Figure 2:
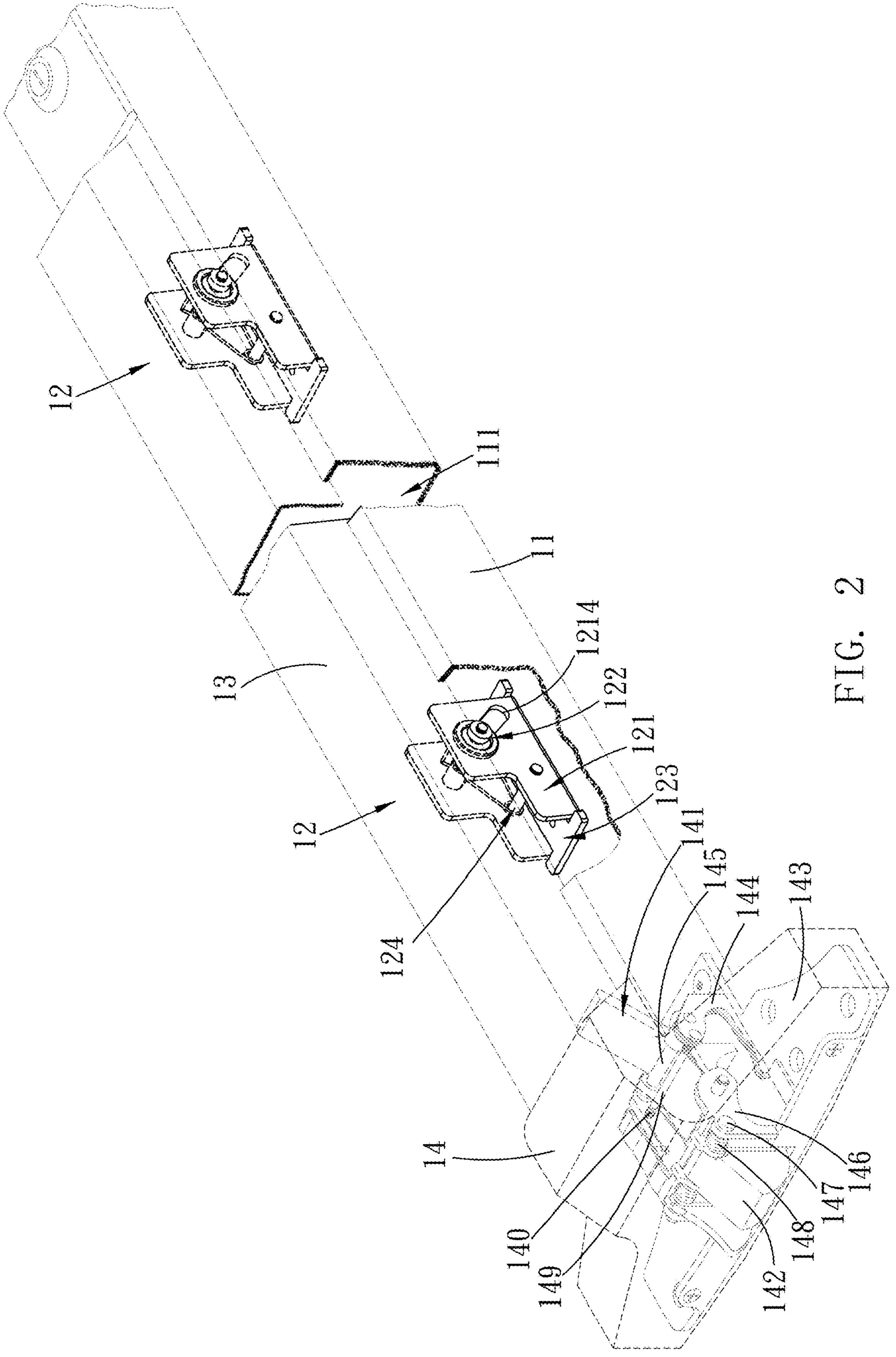
FIG. 2 is a schematic diagram of the door lock structure of the present application before pressing.
Figure 3:
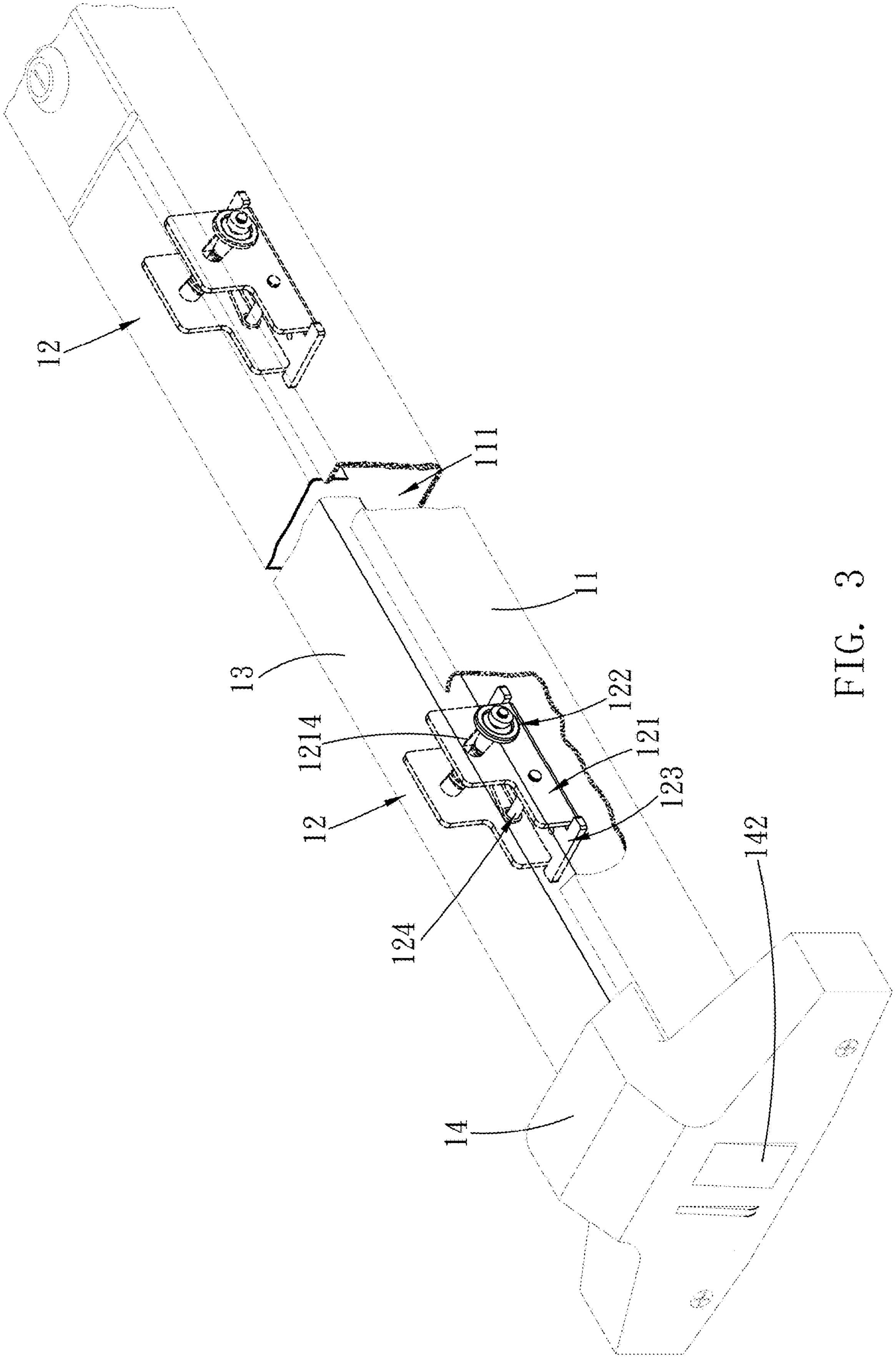
FIG. 3 is a schematic diagram of the door lock structure of the present application after being pressed.
Figure 4:
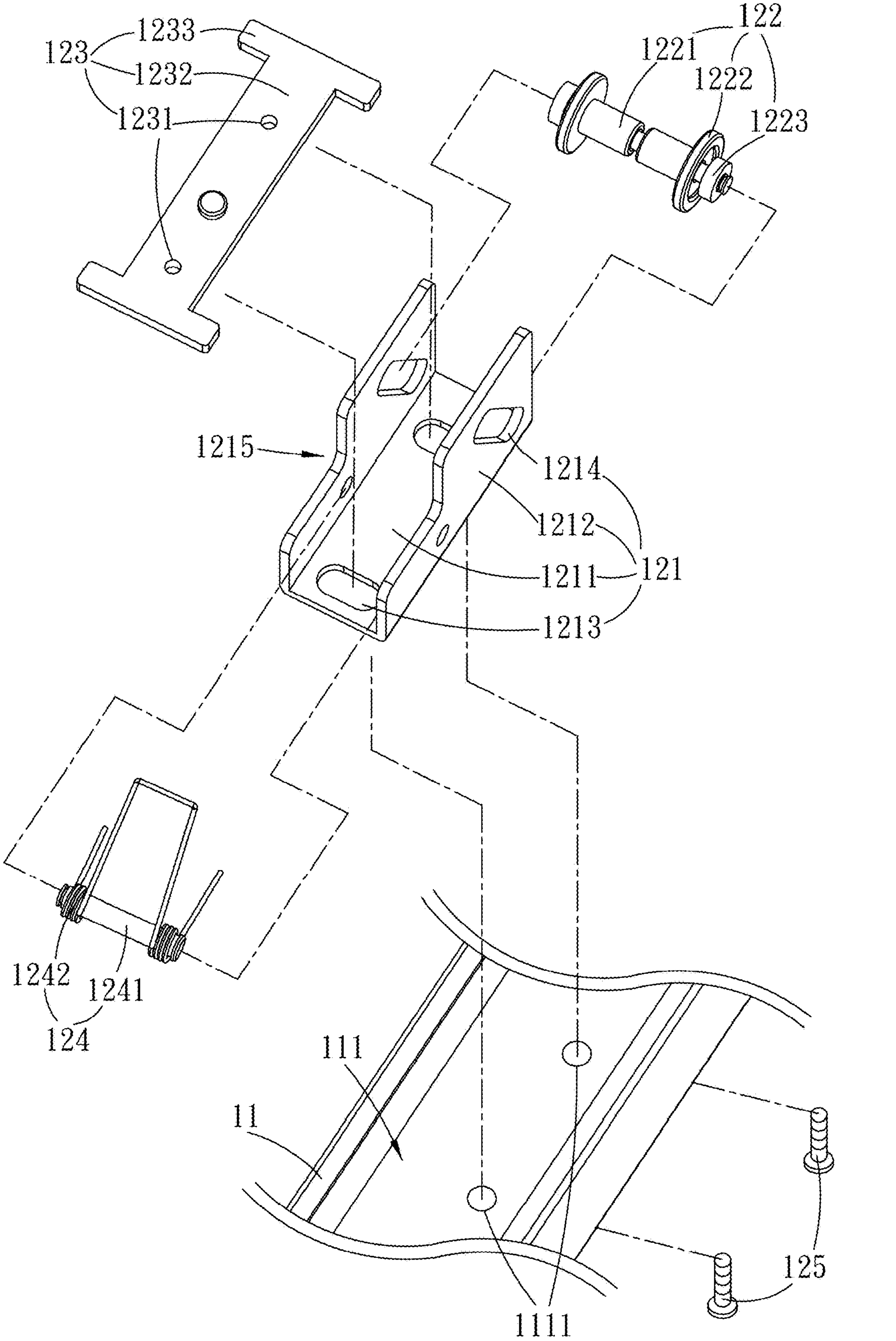
FIG. 4 is an exploded schematic diagram of the pressing component of the present application.
Figure 5:
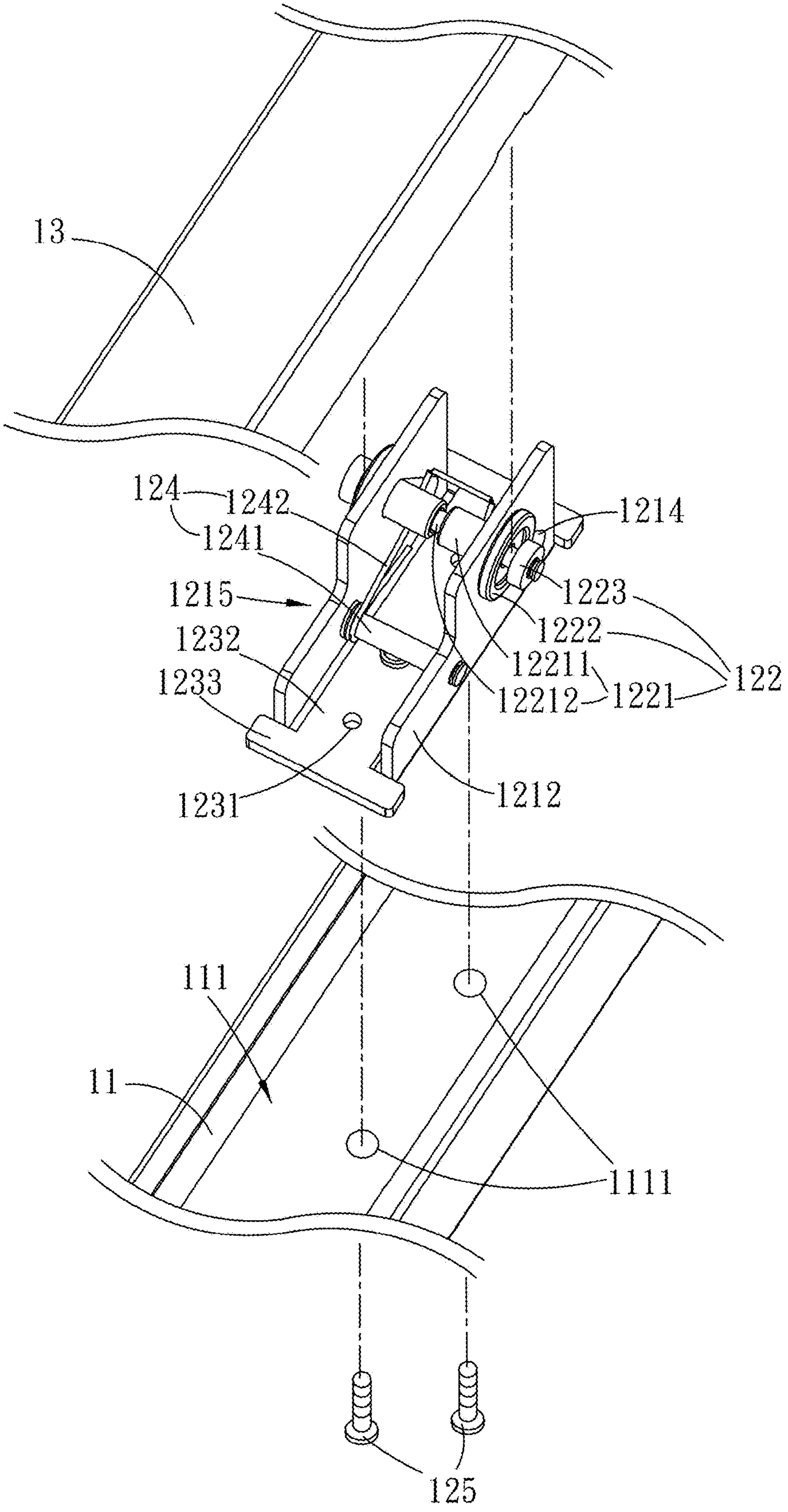
FIG. 5 is a schematic assembly diagram of the pressing component of the present application.
Figure 6:
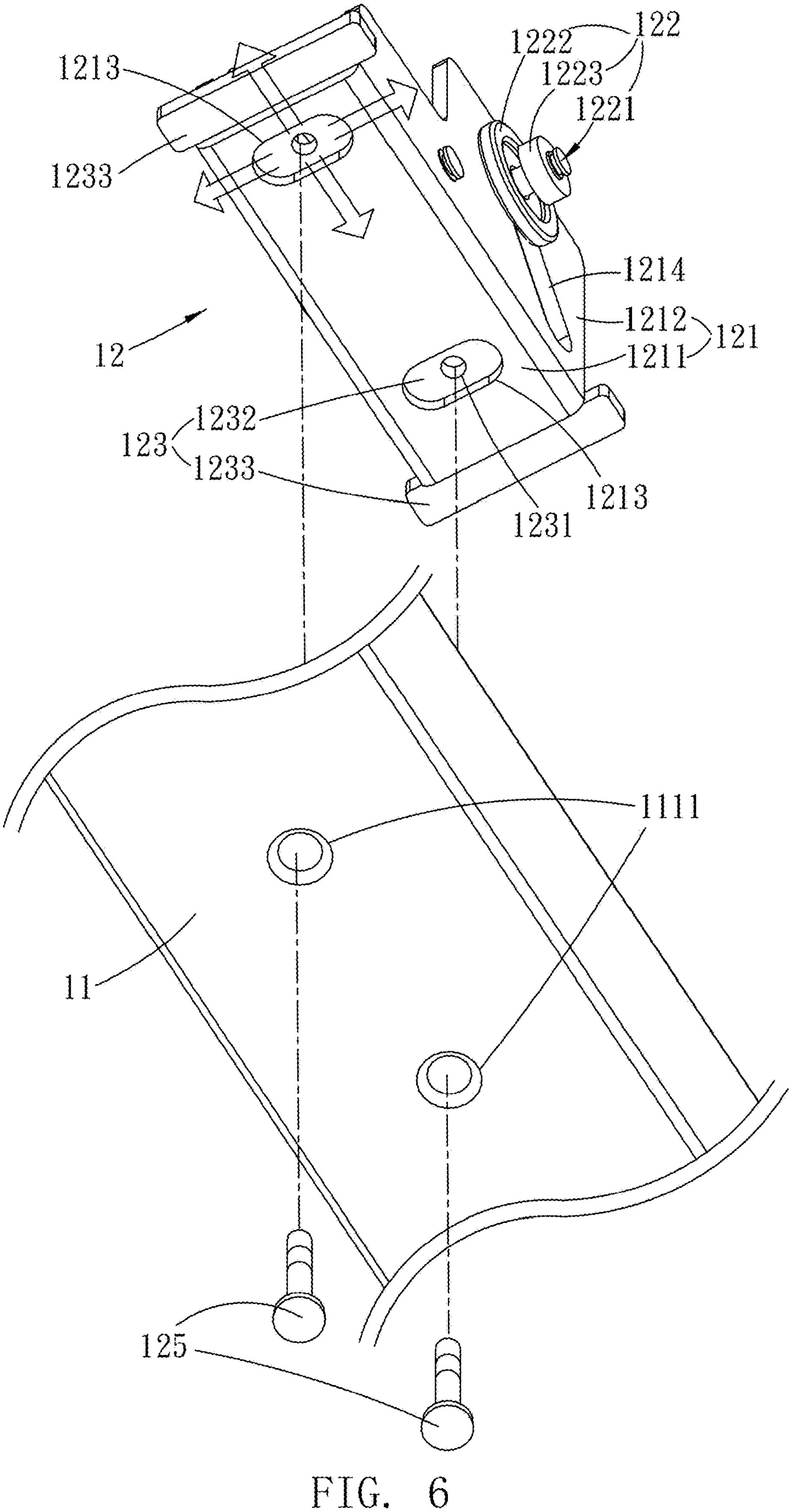
FIG. 6 is a schematic diagram of the assembly and adjustment of the pressing component of the present application.

Please refer to FIG. 1 to FIG. 6 where FIG. 1 is a perspective view of the fire door and door lock structure of the present application, FIG. 2 is a schematic diagram of the door lock structure before pressing, FIG. 3 is a schematic diagram of the door lock structure after being pressed, FIG. 4 is an exploded schematic diagram of the pressing component, FIG. 5 is a schematic assembly diagram of the pressing component, and FIG. 6 is a schematic diagram of the assembly and adjustment of the pressing component. As shown in the figures, a door lock structure 1 is provided in the present application, which is used for being mounting on the fire door 2. The door lock structure 1 in this embodiment is transversely disposed in FIG. 2 and FIG. 3 as schematic diagrams. The following will describe the related illustrations for the door lock structure 1.

In this embodiment, the door lock structure 1 includes a base 11, a pressing component 12, a pressing shell 13 and a locking component 14. The base 11 is disposed on the fire door 2, the base 11 has an accommodation groove 111, and a groove bottom of the accommodation groove 111 has a first locking hole 1111. The pressing component 12 includes a pressing base 121, a roller column 122, a fixing plate 123, an elastic part 124 and a locking part 125. The pressing base 121 has a bottom plate 1211 and two lateral plates 1212, the two lateral plates 1212 extend upward from two sides of the bottom plate 1211, the bottom plate 1211 has an adjusting hole 1213, the two lateral plates 1212 have two sliding holes 1214, the fixing plate 123 has a second locking hole 1231, a hole area of the adjusting hole 1213 is larger than those of the first locking hole 1111 and the second locking hole 1231, one end of the locking part 125 is sequentially inserted through the first locking hole 1111, the adjusting hole 1213 and the second locking hole 1231, the fixing plate 123 fixes the pressing base 121 on the groove bottom of the accommodation groove 111, two ends of the roller column 122 slidingly disposed in the two sliding holes 1214, one end of the elastic part 124 abuts against the fixing plate 123, the other end of the elastic part 124 abuts against a bottom of the roller column 122, and the roller column 122 moves to one end of the sliding hole 1214. The two lateral sides of the pressing shell 13 abut against the two ends of the roller column 122. The locking component 14 is disposed on one end of the base 11. The locking component 14 has a gearing component 141 and a lock 142, the pressing shell 13 presses one end of the gearing component 141, and the other end of the gearing component 141 moves the lock 142.

In this embodiment, the base 11 has the accommodation groove 111, the number of the pressing component 12 is two, the two pressing components 12 are disposed in the accommodation groove 111, and the pressing shell 13 can be completely accommodated in the accommodation groove 111 of the base 11. The peripheral side of the pressing shell 13 has a housing wall, the pressing shell 13 abuts against the pressing component 12 via the housing wall of the two sides, the pressing shell 13 can be pressed into the accommodation groove 111 of the base 11, and at the same time, the pressing shell 13 moves the locking component 14 to unlock the door lock structure 1.

Please refer to FIG. 4 again, this embodiment illustrates the pressing component 12 pressed by the pressing shell 13. In the pressing component 12, the pressing base 121, the roller column 122, the fixing plate 123, the elastic part 124 and the locking part 125 are assembled together. Each lateral plate 1212 of the pressing base 121 has a notch part 1215 located on one side of the sliding hole 1214. The pressing base 121 is a U-shaped structure composed of the bottom plate 1211 and the two lateral plates 1212, i.e. the opening of the pressing base 121 is composed of the two lateral plates 1212 with notch parts 1215. In other words, the space of the opening of the pressing base 121 is larger, the fixing plate 123 can be easily assembled into the pressing base 121 between the two lateral plates 1212 with notch parts 1215 so that the fixing plate 123 is located on the bottom plate 1211 of the pressing base 121.

From the abovementioned, the fixing plate 123 has a plate body part 1232 and two limiting parts 1233, the two limiting parts 1233 are disposed on two ends of a long side of the plate body part 1232 respectively, and the first locking hole 1111 is disposed on the plate body part 1232. The width of the plate body part 1232 of the fixing plate 123 is less than that of the bottom plate 1211 of the pressing base 121, and the length of the plate body part 1232 of the fixing plate 123 is larger than that of the bottom plate 1211 of the pressing base 121. The two limiting parts 1233 respectively extend from the two ends of the plate body part 1232 to the two lateral sides 1212, and the width of each of the two limiting parts 1233 is larger than that of the bottom plate 1211. In this embodiment, when the fixing plate 123 is assembled on the pressing base 121, the displacement of the plate body part 1232 in the wide direction is limited by the two lateral plates 1212 of the pressing base 121, and the displacement of the plate body part 1232 in the long direction is limited by the two limiting parts 1233 of the fixing plate 123. The user can adjust the fixing plate 123 to move on the bottom plate 1211 of the pressing base 121, and relatively speaking, the pressing base 121 can move relatively to the fixing plate 123.

Please refer to FIG. 6 again, in this embodiment, the base 11 has two first locking holes 1111, the fixing plate 123 has two second locking holes 1231, the two first locking holes 1111 and the two second locking holes 1231 are corresponding to each other. In other words, when the position of the fixing plate 123 relative to the base 11 is limited to a fixed position, the pressing base 121 is fixed between the fixing plate 123 and the base 11, the fixing holes of the pressing base 121 have adjusting holes 1213 relative to the first locking hole 1111 and the second locking hole 1231, and the number of the adjusting hole 1213 of the pressing base 121 is also two. The hole area of the adjusting hole 1213 is larger than those of the first locking hole 1111 and the second locking hole 1231. In other words, the user needs to adjust the locking positions of the first locking hole 1111 and the second locking hole 1231 in the hole range of the adjusting holes 1213 so that the pressing base 121 is locked by the fixing plate 123 on the base 11. The user needs to adjust the position of the pressing base 121 relative to the fixing plate 123 and the base 11 in wide direction and in long direction according to the requirement. When the positions of the first locking hole 1111 and the second locking hole 1231 are adjusted in the range of the adjusting hole 1213 of the pressing base 121, the locking part 125 passes through the first locking hole 1111, the second locking hole 1231 and the adjusting hole 1213 to fix the pressing base 121 on the accommodation groove 111 of the base 11 through the fixing plate 123. When the user can conveniently adjust the position of the pressing base 121, the pressing shell 13 is assembled in the accommodation groove 111 of the base 11 according to the pressing component 12, which can make assembly tolerance problems less likely to occur.

Figure 7:
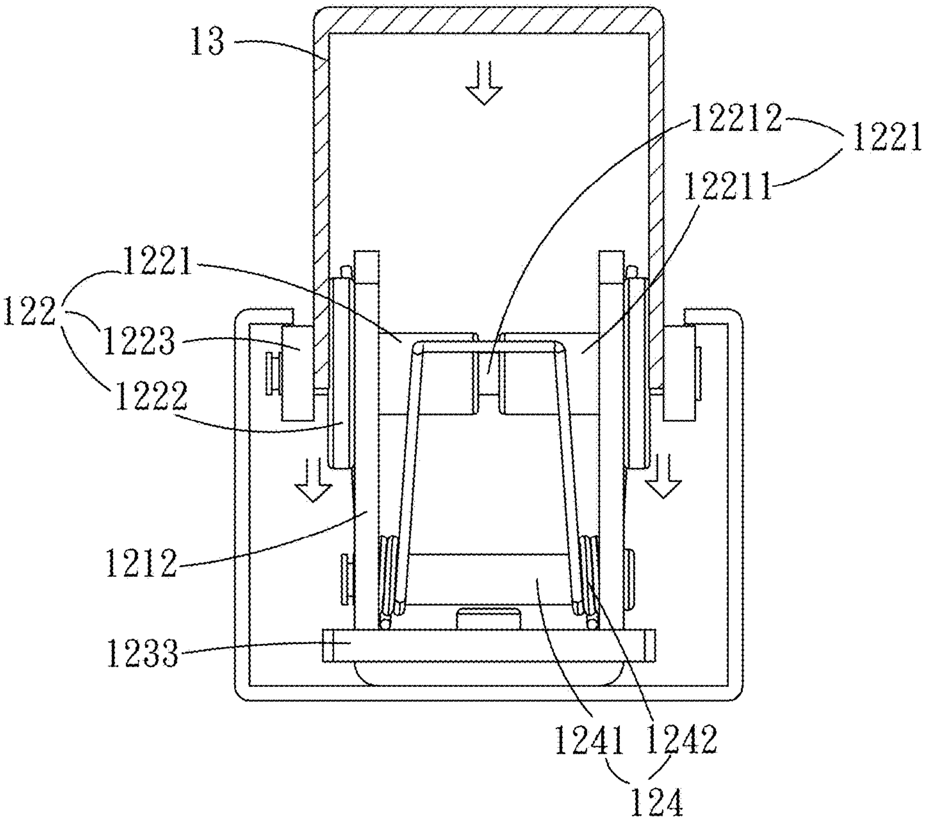
FIG. 7 is a front cross-sectional view of the door lock structure of the present application before pressing.
Figure 8:
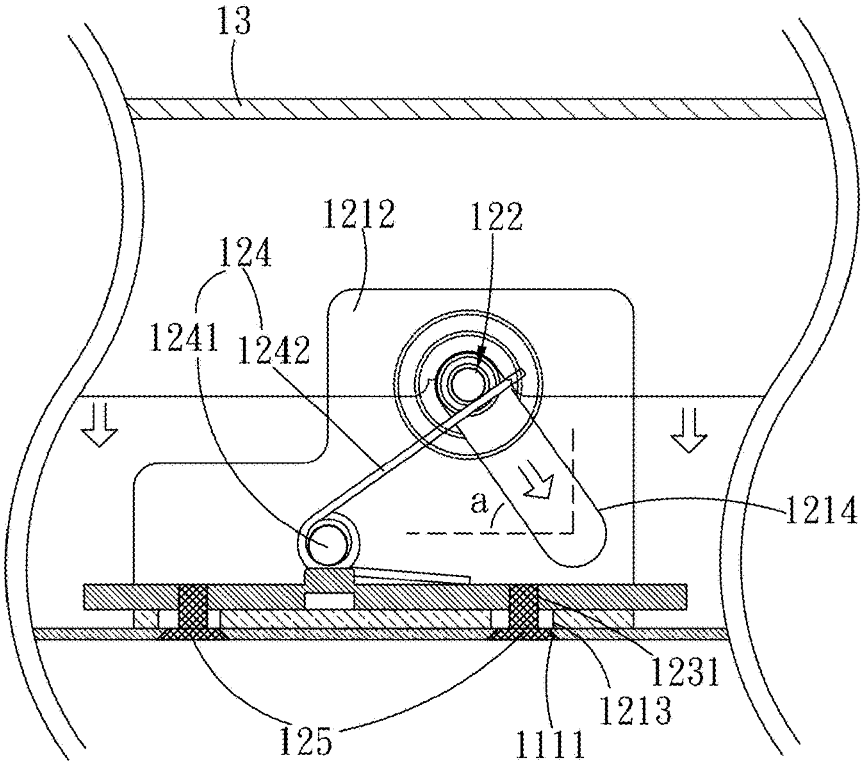
FIG. 8 is a side cross-sectional view of the door lock structure of the present application before pressing.
Figure 9:
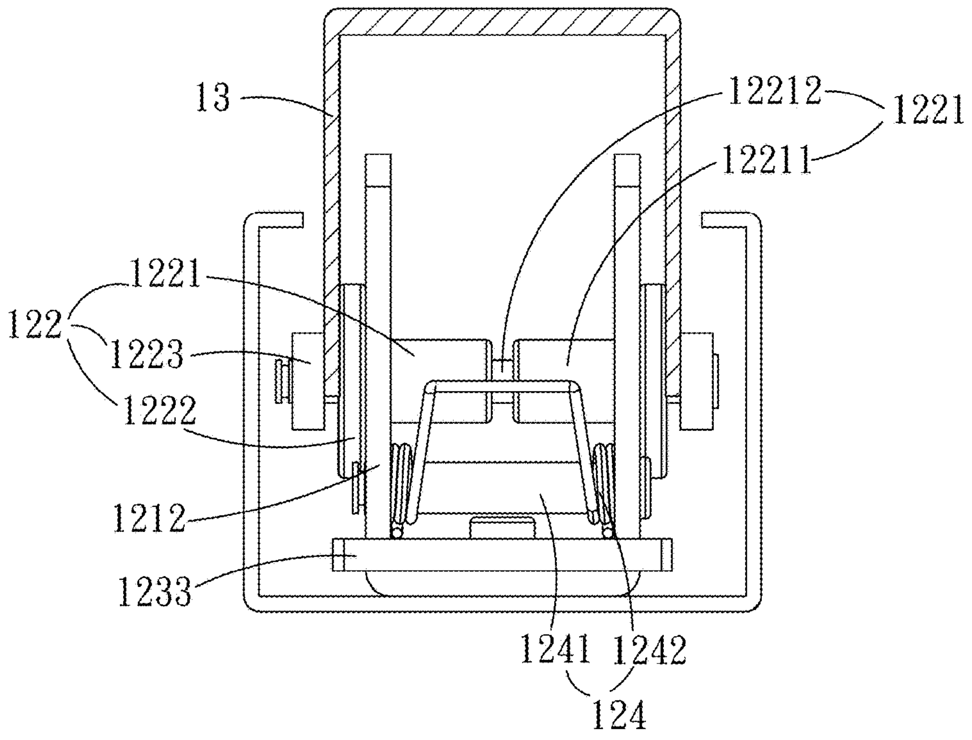
FIG. 9 is a front cross-sectional view of the door lock structure of the present application after being pressed.
Figure 10:
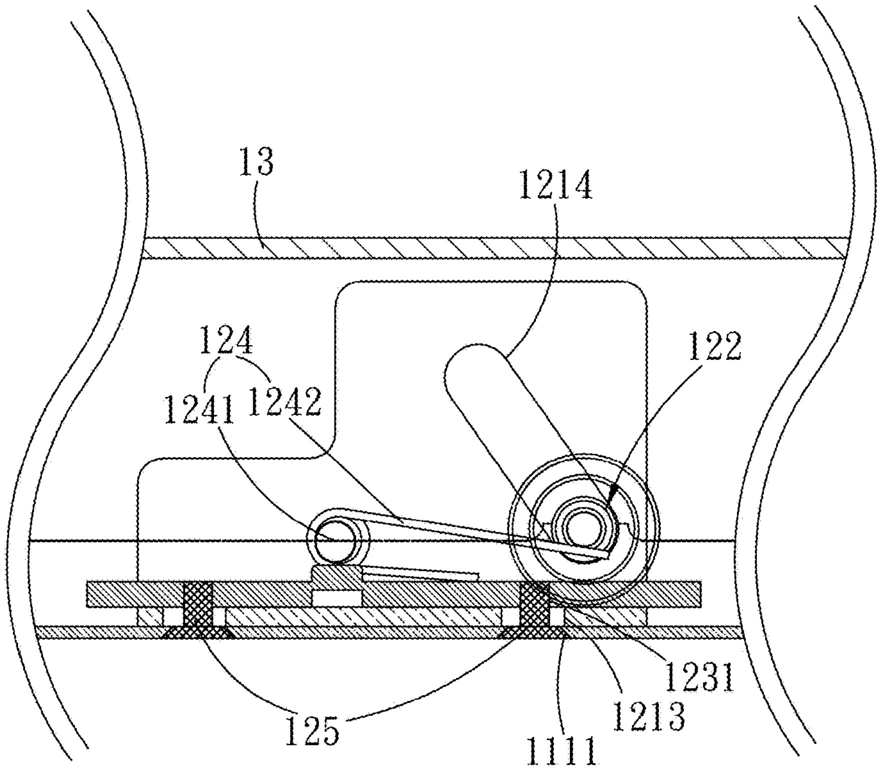
FIG. 10 is a side cross-sectional view of the door lock structure of the present application after being pressed.

Please refer to FIG. 7 to FIG. 10 together where FIG. 7 is a front cross-sectional view of the door lock structure of the present application before pressing, FIG. 8 is a side cross-sectional view of the door lock structure before pressing, FIG. 9 is a front cross-sectional view of the door lock structure after being pressed, and FIG. 10 is a side cross-sectional view of the door lock structure after being pressed. As shown in the figures, in this embodiment, the sliding hole 1214 provides a sliding path for the roller column 122, two ends of the roller column 122 slide along the hole direction of the sliding hole 1214, wherein the sliding hole 1214 has an angle a relative to the surface of the bottom plate 1211, and two ends of the sliding hole 1214 extend along a direction of the angle a. When the user presses the pressing shell 13 vertically so that the pressing shell 13 vertically presses the pressing component 12, the pressing shell 13 will push the roller column 122 to slide along the path of the sliding holes 1214, and the roller column 122 follows the sliding holes 1214 to generate the horizontal displacement and the vertical displacement, so that the pressing shell 13 will slide obliquely into the accommodating groove 111 of the base 11.

Furthermore, the roller column 122 includes a column body 1221, two inner wheels 1222 and two outer wheels 1223, two ends of the column body 1221 pass through the two sliding holes 1214 respectively, the two inner wheels 1222 are disposed on the two ends of the column body 1221 and located at two sides of the pressing base 121, the two outer wheels 1223 are disposed on the two ends of the column body 1221, and the outer wheel 1223 is disposed outside the inner wheel 1222 relatively, and the two lateral sides of the pressing shell 13 abut between the inner wheels 1222 and the outer wheels 1223. In other words, the pressing shell 13 is fixed between the inner wheels 1222 and the outer wheels 1223. The column body 1221 includes two column housings 12211 and a column core 12212, the two column housings 12211 is sleeved onto the outside of the column core 12212, two ends of the column core 12212 pass through the two inner wheels 1222 and the two outer wheels 1223, and the outside of the column housing 12211 is assembled on the two sliding holes 1214. Thus, the two column housings 12211 are fixed in the inside of the two inner wheels 1222, and the two column housings 12211 are slidingly configured in the two sliding holes 1214.

In addition, the elastic part 124 includes a fixing shaft 1241 and a torsion spring 1242, two ends of the fixing shaft 1241 are fixed on the two lateral plates 1212, the torsion spring 1242 is wound around the fixing shaft 1241, one end of the torsion spring 1242 abuts against the fixing plate 123, and the other end of the torsion spring 1242 abuts under the roller column 122. The structure of the torsion spring 1242 is made by the process that after bending the elastic wire, and the two ends of the elastic wire are wound around the two ends of the fixing shaft 1241 to make the extension segment abut against the fixing plate 123, i.e. the pressed one end of the torsion spring 1242 is the extension segment of the elastic wire. The bending segment of the elastic wire supports under the roller column 122, i.e. the other end of the torsion spring 1242 is the bending segment of the elastic wire. When the bending segment of the torsion spring 1242 is pressed by the roller column 122, the pressed bending segment of the torsion spring 1242 provides reaction force to make the bending segment of the torsion spring 1242 provide supporting force under the roller column 122. After the pressing shell 13 pressing the pressing component 12, if the pressing component 12 is no longer pressed with force, the torsion spring 1242 of the pressing component 12 will push up against the roller column 122, and then the roller column 122 will also push up the pressing shell 13, thereby restoring the pressing shell 13 to its original unpressed state.

Figure 11:
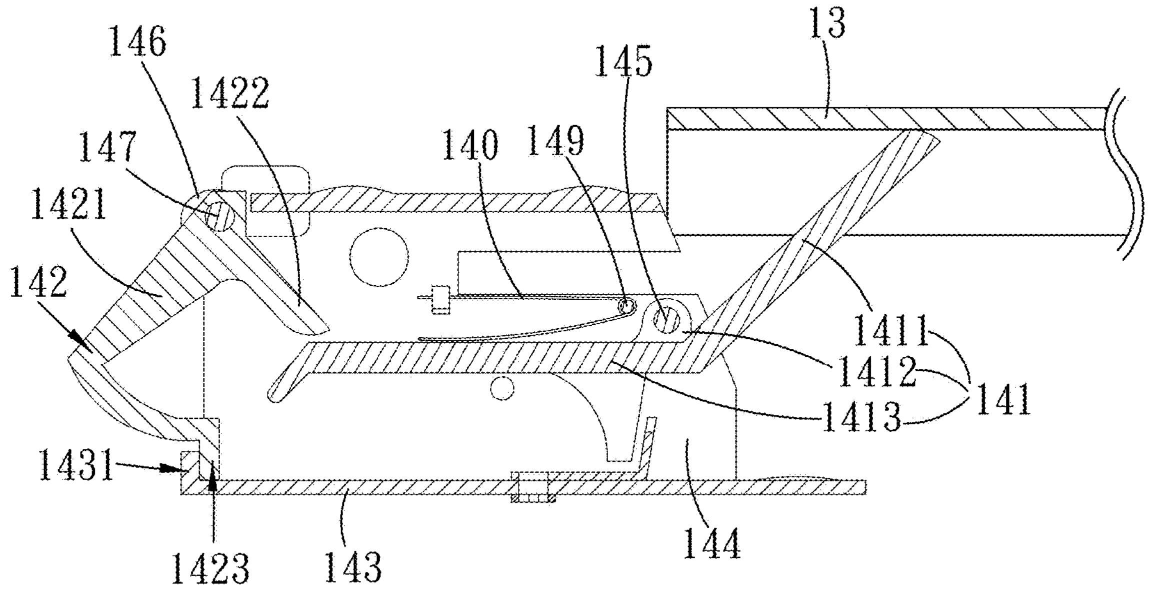
FIG. 11 is a schematic cross-sectional view of the locking component of the door lock structure of the present application before pressing.
Figure 12:
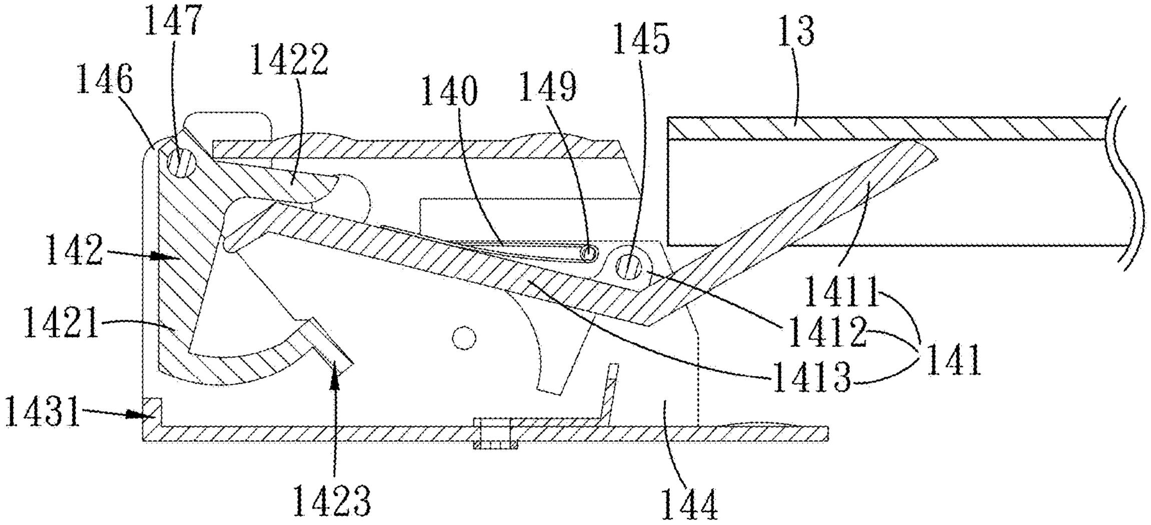
FIG. 12 is a schematic cross-sectional view of the locking component of the door lock structure of the present application after being pressed.

Please refer to FIG. 11 and FIG. 12 together where FIG. 11 is a schematic cross-sectional view of the locking component of the door lock structure of the present application before pressing; and FIG. 12 is a schematic cross-sectional view of the locking component of the door lock structure after being pressed. As shown in the figures, in this embodiment, the locking component 14 further includes a locking base 143, a driving fix bracket 144 and a driving pivot shaft 145. The locking base 143 is disposed at one end of the base 11, the driving fix bracket 144 is disposed on the locking base 143, the driving pivot shaft 145 is disposed on the driving fix bracket 144, the gearing component 141 comprises a pressing part 1411, a pivot part 1412 and a gearing part 1413, the inner side of the pressing shell 13 abuts against one end of the pressing part 1411, the other end of the pressing part 1411 is connected to one end of the gearing part 1413, the other end of the gearing part 1413 abuts against the lock 142, the pivot part 1412 is disposed between the pressing part 1411 and the gearing part 1413, and the pivot part 1412 is rotationally disposed on the driving pivot shaft 145. The pressing part 1411 and the gearing part 1413 have a bending angle therebetween, and the pivot part 1412 is located on one side which the pressing part 1411 and the gearing part 1413 have the bending angle. When the pressing part 1411 is pressed, the gearing part 1413 rotates clockwise with the driving pivot shaft 145 as a fulcrum, thereby linking the gearing part 1413 to the lock 142.

In addition, the locking component 14 further includes an auxiliary fixing shaft 149 and an auxiliary torsion spring 140, the auxiliary fixing shaft 149 is disposed on the driving fix bracket 144, the auxiliary torsion spring 140 is disposed on the auxiliary fixing shaft 144, one end of the auxiliary torsion spring 140 is fixed on the driving fix bracket 144, and the other end of the auxiliary torsion spring 140 abuts against the gearing part 1413 of the gearing component 141. When the gearing part 1413 is linked to the lock 142, the gearing part 1413 compresses the other end of the auxiliary torsion spring 140. In other words, the auxiliary torsion spring 140 provides the elastic force for the gearing part 1413 to rotate counterclockwise.

Please refer to FIG. 2, FIG. 11 and FIG. 12 again, the locking component 14 further includes a lock fix bracket 146, a lock pivot shaft 147 and a lock torsion spring 148, the lock fix bracket 146 is disposed on the locking base 143, the lock pivot shaft 147 is rotationally disposed on the lock fix bracket 146, the lock 142 is disposed on the lock pivot shaft 147, one end of the lock torsion spring 148 abuts against the lock 142, the other end of the lock torsion spring 148 abuts against the locking base 143, and one end of the lock torsion spring 148 drives the lock 142 to rotate outwardly. Furthermore, the locking base 143 further includes a first limiting part 1431, one end of the lock 142 further includes a second limiting part 1423, the second limiting part 1423 is located on one side of the lock 142 far away from the lock pivot shaft 147, the first limiting part 1431 is located on a path that the second limiting part 1423 of the lock 142 rotates clockwise and outwardly, and the lock torsion spring 148 drives the second limiting part 1423 of the lock 142 to rotationally abut against the first limiting part 1431 of the locking base 143. Thus, the first limiting part 1431 and the second limiting part 1423 limit the range that the lock 142 rotates clockwise and outwardly.

Furthermore, please refer to FIG. 1 again, the lock 142 further includes a fixing protrusion part 1421 and a lock gearing part 1422, the lock gearing part 1422 is disposed on one side of the fixing protrusion part 1421, the lock pivot shaft 147 is disposed between the fixing protrusion part 1421 and the lock gearing part 1422, the inner side of the fixing protrusion part 1421 and the lock gearing part 1422 appears a groove structure. The other end of the gearing part 1413 of the gearing component 141 abuts against the inner side of the lock gearing part 1422 of the lock 142. When the gearing part 1413 rotates clockwise and abuts against the lock gearing part 1422 of the lock 142, the fixing protrusion part 1421 of the lock 142 rotates counterclockwise with the lock pivot shaft 147 as the fulcrum, and then the fixing protrusion part 1421 retracts into the locking base 143. The fixing protrusion part 1421 of the lock 142 of the door lock structure 1 is not stuck in the lock hole 31 of the doorway 3, and the fire door 2 can be opened without restriction.

In this embodiment, the fire door 2 closes the doorway 3. When the user does not push the pressing shell 13, the fixing protrusion part 1421 of the lock 142 of the door lock structure 1 will fit into the lock hole 31 of the doorway 3 to make the fire door 2 appear closed. When the user pushes the pressing shell 13 to the direction of the base 11 (i.e. shown in FIG. 2 and FIG. 3), the two ends of the roller column 122 are pressed by the pressing shell 13, and the two ends of the roller column 122 move obliquely along the two sliding holes 1214, so the pressing shell 13 is obliquely pressed into the accommodation groove 111 of the base 11. Further, the elastic part 124 is pressed by the roller column 122, and the elastic part 124 is in a state of compression and rebound. The gearing component 141 is downwardly pressed by the inner side of the pressing shell 13, the gearing part 1413 of the gearing component 141 abuts against the lock gearing part 1422 of the lock 142 so that the fixing protrusion part 1421 of the lock 142 retracts from the lock hole 31 of the doorway 3 to the locking base 143, and then the fixing protrusion part 1421 of the door lock structure 1 is not stuck in the lock hole 31 of the doorway 3, so the fire door 2 is not restricted by the lock 142 and the lock hole 31.

Further, when the user does not push the pressing shell 13, the elastic restoring force of the elastic part 124 supports the roller column 122 so that the roller column 122 is lifted up to move to one end of the sliding hole 1214, two ends of the roller column 122 lift up the pressing shell 13. Additionally, the auxiliary torsion spring 140 drives the gearing component 141 to rotate counterclockwise, making the pressing part 1411 of the gearing component 141 lift up the inner side of the pressing shell 13. At meanwhile, the lock torsion spring 148 also drives the lock 142 to rotate outwardly, the lock gearing part 1422 of the lock 142 pushes downwardly the gearing part 1413 of the gearing component 141, and the pressing part 1411 of the gearing component 141 is driving to lift up the inner side of the pressing shell 13, thereby the fixing protrusion part 1421 of the lock 142 rotating outwardly again from the locking base 143.

In summary, A door lock structure is provided in which the fixing plate of the pressing component serves as a structure of adjusting the fixed position of the pressing base. The locking part sequentially locks the first locking hole of the base, the adjusting hole of the pressing base and the second locking hole of the fixing plate. The first locking hole of the base and the second locking hole of the fixing plate are in relatively restricted fixing positions. The hole area of the adjusting hole of the pressing base is larger than the hole areas of the first locking hole and the second locking hole, so the fixing position of the pressing base is not limited by the first locking hole and the second locking hole. Thus, the pressing base can adjust position according to the tolerance of the inner structure, which is beneficial to the assembly of the door lock structure.

It is to be understood that the term "comprises", "comprising", or any other variants thereof, is intended to encompass a non-exclusive inclusion, such that a process, method, article, or device of a series of elements not only include those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

The invention claimed is:

1. A door lock structure for installing on a fire door comprising:

a base disposed on the fire door, wherein the base has an accommodation groove, and a groove bottom of the accommodation groove has a first locking hole;

a pressing component comprising a pressing base, a roller column, a fixing plate, an elastic part and a locking part, wherein the pressing base has a bottom plate and two lateral plates, the two lateral plates respectively extend upward from two sides of the bottom plate, the bottom plate has an adjusting hole, the two lateral plates have two sliding holes, the fixing plate has a second locking hole, a hole area of the adjusting hole is larger than those of the first locking hole and the second locking hole, one end of the locking part is sequentially inserted through the first locking hole, the adjusting hole and the second locking hole, the fixing plate fixes the pressing base on the groove bottom of the accommodation groove, two ends of the roller column are respectively and slidingly disposed in the two sliding holes, one end of the elastic part abuts against the fixing plate, the other end of the elastic part abuts against a bottom of the roller column, and the roller column moves to one end of the sliding hole;

a pressing shell, wherein two lateral sides of the pressing shell abut against the two ends of the roller column, respectively; and a locking component disposed on one end of the base, wherein the locking component comprises a gearing component and a lock, the pressing shell presses one end of the gearing component, and the other end of the gearing component moves the lock;

wherein the pressing shell presses toward to the base, the pressing shell presses the two ends of the roller column, the two ends of the roller column move along the two sliding holes, the roller column presses the elastic part, the elastic part is in a compression state, the pressing shell presses the gearing component, and the gearing component moves the lock.

2. The door lock structure as claimed in claim 1, wherein a radial axis of the sliding hole and a surface of the bottom plate forms an angle, and one end of the sliding hole extends along a direction of the angle.

3. The door lock structure as claimed in claim 1, wherein each of the lateral plates has a notch part disposed on one side of the sliding hole.

4. The door lock structure as claimed in claim 1, wherein the roller column comprises a column body, two inner wheels and two outer wheels, two ends of the column body pass through the two sliding holes respectively, the two inner wheels are disposed on the two ends of the column body and located at two sides of the pressing base, the two outer wheels are disposed on the two ends of the column body, and the outer wheel is disposed outside the inner wheel relatively, and the two lateral sides of the pressing shell abut between the inner wheels and the outer wheels.

5. The door lock structure as claimed in claim 1, wherein the fixing plate has a plate body part and two limiting parts, the two limiting parts are disposed on two ends of a long side of the plate body part respectively, a width of the plate body part is less than that of the bottom plate, a length of the plate body part is larger than that of the bottom plate, the two limiting parts respectively extend from the two ends of the plate body part to the two lateral sides, a width of each of the two limiting parts is larger than that of the bottom plate.

6. The door lock structure as claimed in claim 1, wherein the elastic part comprises a fixing shaft and a torsion spring, two ends of the fixing shaft are fixed on the two lateral plates, the torsion spring is wound around the fixing shaft, one end of the torsion spring abuts against the fixing plate, and the other end of the torsion spring abuts under the roller column.

7. The door lock structure as claimed in claim 1, wherein the locking component further comprises a locking base, a driving fix bracket and a driving pivot shaft, the locking base is disposed at one end of the base, the driving fix bracket is disposed on the locking base, the driving pivot shaft is disposed on the driving fix bracket, the gearing component comprises a pressing part, a pivot part and a gearing component, an inner side of the pressing shell abuts against one end of the pressing part, the other end of the pressing part is connected to one end of the gearing component, the other end of the gearing component abuts against the lock, the pivot part is disposed between the pressing part and the gearing component, and the pivot part is rotationally disposed on the driving pivot shaft.

8. The door lock structure as claimed in claim 7, wherein the locking component further comprises an auxiliary fixing shaft and an auxiliary torsion spring, the auxiliary fixing shaft is disposed on the driving fix bracket, the auxiliary torsion spring is disposed on the auxiliary fixing shaft, one end of the auxiliary torsion spring is fixed on the driving fix bracket, and the other end of the auxiliary torsion spring abuts against the gearing component of the gearing component.

9. The door lock structure as claimed in claim 7, wherein the locking component further comprises a lock fix bracket, a lock pivot shaft and a lock torsion spring, the lock fix bracket is disposed on the locking base, the lock pivot shaft is rotationally disposed on the lock fix bracket, the lock is disposed on the lock pivot shaft, one end of the lock torsion spring abuts against the lock, the other end of the lock torsion spring abuts against the locking base, and one end of the lock torsion spring drives the lock to rotate outwardly.

10. The door lock structure as claimed in claim 9, wherein the lock further comprises a fixing protrusion part and a lock gearing part, the lock gearing part is disposed on one side of the fixing protrusion part, the lock pivot shaft is disposed between the fixing protrusion part and the lock gearing part, the other end of the gearing component abuts against the lock gearing part of the lock.

11. The door lock structure as claimed in claim 9, wherein the locking base further comprises a first limiting part, one end of the lock further comprises a second limiting part, the first limiting part is located on a path that the second limiting part of the lock rotates outwardly, and the second limiting part of the lock rotationally abuts against the first limiting part of the locking base.

* * * * *